UNITED STATES PATENT OFFICE.

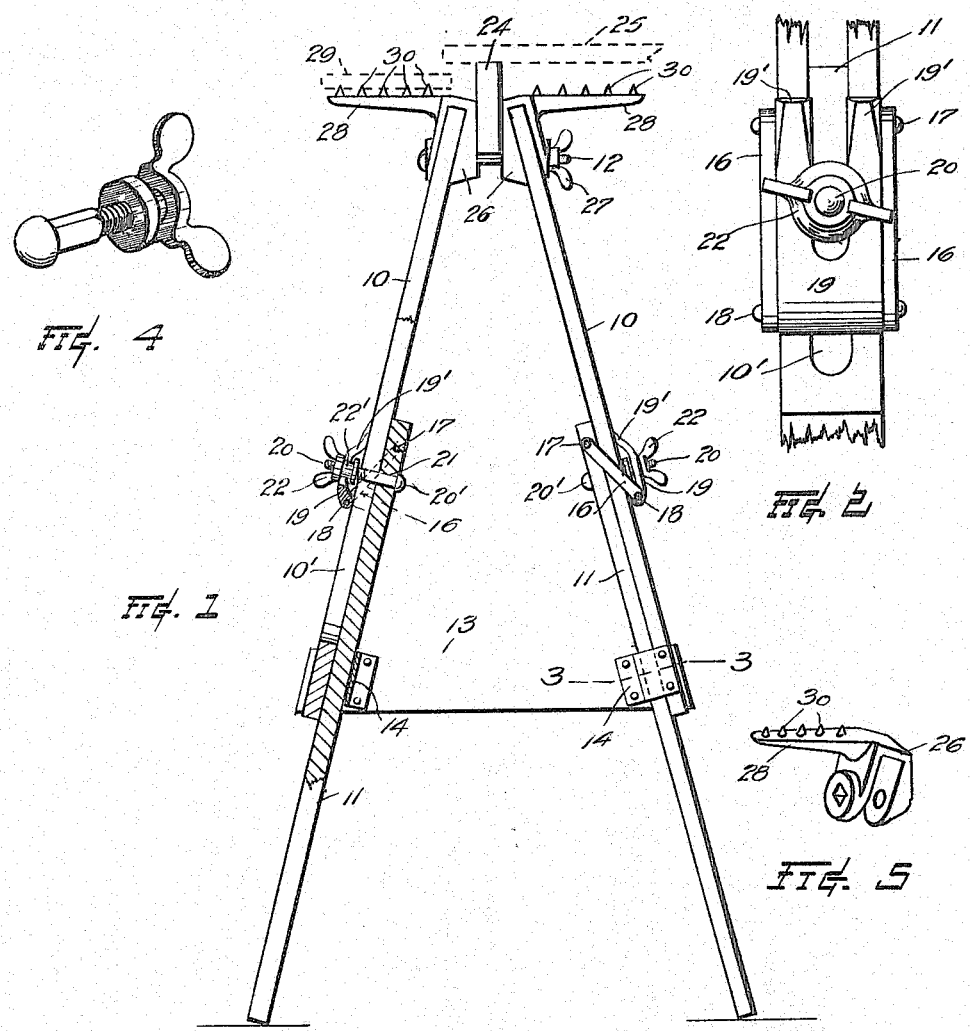

JOHN J. MACKLEM, OF HOQUIAM, WASHINGTON.

SCAFFOLD-SUPPORT.

1,129,410.  Specification of Letters Patent.  Patented Feb. 23, 1915.

Application filed March 10, 1914. Serial No. 823,659.

*To all whom it may concern:*

Be it known that I, JOHN J. MACKLEM, a citizen of the United States, residing at Hoquiam, in the county of Chehalis and State of Washington, have invented certain new and useful Improvements in Scaffold-Supports, of which the following is a specification.

This invention relates to extensible trestles for use by painters, carpenters and other artisans who work upon scaffolding.

The object of the invention is the perfecting of apparatus of this class to render the same more convenient to handle and adjust and obviating all danger of the apparatus collapsing through slipping of the parts where they are joined.

The invention consists in the novel construction and adaptation of devices, as will be hereinafter described and claimed.

In the accompanying drawings, Figure 1 is an elevational end view shown partly in section of a trestle with the present invention applied thereto. Fig. 2 is a fragmentary side view of the same to an enlarged scale. Fig. 3 is a detail sectional view through 3—3 of Fig. 1. Fig. 4 is a perspective view of a securing bolt and nut for one of the trestle legs. Fig. 5 is a perspective view of a trestle-leg bracket attachment.

A trestle, as shown in Fig. 1, is formed substantially like the letter A being constituted of two oppositely inclined legs, each of which is comprised of an upper member 10 and a lower member 11. Said legs are connected near their top ends by a bolt 12 and at a distance therebelow by a transversely arranged bar 13 which is rigidly secured to the lower ends of the leg-members 10.

The members of each leg are extensibly connected by means of a strap or plate 14 which is rigidly secured to the bar 13 and an upper member 10 so as to provide with the latter a sleeve or housing (see Fig. 3) in which the lower member 11 is endwise slidable. To fasten the member 11 in adjusted position with respect to its companion member 10, I provide the following described devices: Each such fastening device comprises a pair of links 16 which are pivotally connected in proximity to their inner ends to a pin 17 which is secured to and passes through a lower leg member 11. The other ends of the referred to links are pivotally connected to a pin 18 to which is also pivotally connected the lower end of a bifurcated clamping plate 19. 20 represents a bolt which is screw-threaded at one end and is provided with a head $20^1$ at the other end. Adjacent to the head the bolt is formed square in cross-section so that when the bolt is inserted in a correspondingly shaped hole 21 in the member 11, the bolt is rendered non-rotatable. The bolt thus secured to the lower member extends through a slot $10^1$ provided in the upper member 10 and to a distance beyond the clamping plate 19. Provided for the bolt 20 is a winged nut 22 having in its periphery a groove $22^1$ to receive the bifurcations $19^1$ of the clamping plate thereby engaging the nut to the latter for independent axial movements but allowing the nut being turned upon the bolt. To prevent the nut bearing against the adjacent leg-member, the plate 19 is curved to have its central portion whereon is carried the nut in spaced relation with the leg-member 10 when the plate-ends are juxtaposed therewith.

In operating the above described fastening devices, a nut 22 is first unscrewed to remove the strain which is applied through the bolt 20 to the plate 19, which serves as a washer with respect to the nut. Upon the plate being thus loosened, the leg-member 11 is adjustably moved lengthwise with respect to the member 10, it being freely movable through the housing 14, and the bolt 20 is free to move within the slot $10^1$. When a leg is properly regulated, the securing bolt 20 therefor is caused to become operative through the agency of the nut 22 thereof in coöperation with the plate 19 so that the members of a leg will be clamped between a bolt-head and the plate. When the relative positions of the companion-members of a leg are changed, the links 16 will accommodate themselves to the relative movements of the members only when the nut is unscrewed, otherwise any tendency of the upper member to slip would be counteracted through the office of the links and the greater the load the more securely will the links cause the plate to engage the leg-member.

It may be said that in practice the leg-members are constructed of wood and the tightening of the nut causes the ends of a plate 19 to embed themselves sufficiently into the material so that no appreciable movement will ensue between the plate and the leg against which the same bears when constrained by the bolt and nut.

Also included in the invention are devices which surmount the leg-members 10 and serve as jaw elements by which the trestle is gripped through the instrumentality of the aforesaid bolt 12 to a beam 24 whereby a platform board or boards, indicated by 25, are supported. Said jaw members are constructed of metal, such as malleable iron, and are each comprised of a saddle-shaped block 26 which is fitted to the upper ends of the respective leg-member 10 and provided with holes to accommodate the bolt 12. The bolt 12 is provided with a head at one end and the other end is screw-threaded to receive a winged nut 27 wherewith the beam 24 is clamped between said jaw-members.

The blocks 26 are each provided with an arm 28 to serve as a bracket-support for a board, as indicated by 29, which may advantageously be employed as a bridge between the two trestles similar to that illustrated in Fig. 1. To prevent any displacement of a board upon the bracket-support 28, the latter is formed on its top with projections 30 to penetrate the wood.

The operation of the invention will, it is thought, be understood from the foregoing.

What I claim, is—

1. In apparatus of the class described, the combination with the leg-members, a plate seated against one of said members, link connections between the lower end of said plate and the member remote from the plate and means extending through both of the members and the plate whereby the members are clamped together.

2. In apparatus of the class described, the combination with a leg formed of two members extensibly connected together, of fastening means for securing said leg-members in adjusted positions, said means comprising a headed bolt extending through both members, a plate juxtaposed with one of said members, links pivotally connected with said plate and also with the member remote therefrom, and a nut engaging screw-threads of said bolt and arranged to engage against said plate whereby the legs are caused to be clamped between the plate and the head of the bolt.

3. In apparatus of the class described, a fastening means for securing an extensible leg in adjusted positions, said means comprising a screw-threaded bolt secured to one of said members and passing through a slot provided in the other of the leg-members, a plate connected with the first named member and juxtaposed with the other member, and a nut engaging with the bolt and coöperating with the latter and the plate for clamping the two members together.

Signed at Hoquiam, Wash., this 24th day of February, 1914.

JOHN J. MACKLEM.

Witnesses:
GEO. F. PALMER,
C. J. RITCHIE.

Copies of this patent may be obtained for five cents each, by addressing the "Commissioner of Patents, Washington, D. C."